(12) United States Patent
Rucinski et al.

(10) Patent No.: US 6,212,971 B1
(45) Date of Patent: Apr. 10, 2001

(54) VIBRATION ISOLATED SHIFT LEVER

(75) Inventors: Joseph R. Rucinski, Bancroft, WI (US); Donald Orville Johannsen, Sherrill, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/468,046

(22) Filed: Dec. 21, 1999

(51) Int. Cl.$^7$ ................................................. B60K 20/04
(52) U.S. Cl. ........................................ 74/523; 74/473.29
(58) Field of Search ................................ 74/523, 473.29, 74/548

(56) References Cited

U.S. PATENT DOCUMENTS

| | | | |
|---|---|---|---|
| 1,852,979 | * 4/1932 | Moorhouse | 74/473.29 |
| 4,528,863 | * 7/1985 | Theodore et al. | 74/473.29 |
| 4,603,598 | 8/1986 | Tsuji et al. | 74/473 |
| 4,916,966 | 4/1990 | Weishaupt et al. | 74/473 |
| 4,960,009 | 10/1990 | Schultz et al. | 74/473 |
| 5,136,893 | 8/1992 | Wilhelmy | 74/473 |
| 5,189,925 | 3/1993 | Neal et al. | 74/473 |
| 5,452,623 | 9/1995 | Knight | 74/473 |
| 5,560,253 | 10/1996 | Ishikawa et al. | 74/473 |

\* cited by examiner

Primary Examiner—Mary Ann Green

(57) ABSTRACT

A vibration isolated shift lever comprises a control lever, a shift plate, a transmission plate, a transmission lever and resilient bushings located between the shift plate and transmission plate. The shift plate triangularly shaped and is provided with three shift plate apertures one being located at each of the apexes of the triangular shift plate. The transmission plate provided with a transmission lever receiver that is bolted to the transmission lever. The transmission plate is triangularly shaped and provided with three transmission plate apertures that are located at the apexes of the triangular transmission plate. The shift plate and the transmission plate are aligned so that the three shift plate apertures are lined up with the three transmission plate apertures. Three mounting bolts extend through the lined up shift plate apertures and transmission plate apertures. Each of the bolts is provided with a resilient rubber bushing. The resilient bushing is positioned between the shift plate and the transmission plate with the resilient bushings extending into and through the respective shift plate apertures. A rigid sleeve is located in the central tunnel of the bushing. The rigid sleeve is shorter than the central tunnel. The mounting bolts are provided with a washer that engages the rigid sleeve and the resilient bushing. A cap portion of the resilient bushing is positioned between the shift plate and the transmission plate. The resilient bushing is compressed by the application of a lock nut engaging the mounting bolts on the other side of the transmission plate. Compressing the bushing radially deforms the sleeve portion of the bushing outwardly between the washer and the shift plate.

13 Claims, 3 Drawing Sheets

VIBRATION ISOLATED SHIFT LEVER

BACKGROUND OF THE INVENTION

1. Field of the Invention

The present invention is directed to a vibration isolating gear shift lever wherein a layer of resilient material is located between the control lever and the transmission lever for dampening vibrations originating in the engine and/or transmission that are received by the gear shift lever.

2. Description of the Prior Art

Vehicles like automobiles, trucks, loader backhoes, four wheel drive loaders and agricultural tractors are provided with an engine and a transmission for propelling and operating the vehicle. Many times the transmission is a mechanical transmission having a number of gear settings or speeds. The different gear settings or speeds control the speed and propulsion power of the vehicle. The gear settings for a mechanical transmission may be changed by a direct shifter wherein a transmission lever extends from the transmission and is coupled to a gear shift lever located in the operators compartment. An operator manually positions the gear shift lever to change transmission gear settings and speeds. This direct connection between the transmission and the gear shift lever may lead to objectionable gear shift lever vibration and noise. To overcome this problem vibration isolators have been used between the gear shift lever and the transmission lever to dampen these vibrations. The isolators typically are formed from a resilient material such as rubber and provide a layer of resilient material between the gear shift lever and the transmission lever.

SUMMARY OF THE INVENTION

It is an object of the present invention to provide a vibration isolated shift lever for a work vehicle using three resilient bushings to provide a layer of resilient material between a triangular shift plate and a triangular transmission plate.

It is another object of the present invention to provide a vibration isolated shift lever which can be tuned in two axes to minimize lever vibration and noise.

It is another object of the present invention to provide a vibration isolated shift lever to which a torque can be applied.

It is another object of the present invention that the vibration isolated shift lever is easy to assemble and uses off the shelf components.

The vibration isolated shift lever comprises a control lever, a shift plate, a transmission plate, a transmission lever and resilient bushings located between the shift plate and transmission plate. The control lever is provided with a handle portion and a base portion. The base portion is rigidly attached to the shift plate by welding. The base portion also defines a control lever axis. The shift plate is triangular and is provided with three shift plate apertures one being located at each of the apexes of the triangular shift plate. The shift plate apertures are circumferentially spaced about the control lever axis. By selecting the radial spacing of each shift plate aperture from the control lever axis a designer can tune the isolator to minimize vibration and noise in the side-to-side axis, the fore/aft axis and the control lever axis. It has been found when applying this isolator to backhoes that it is desirable to have the isolator stiff in the fore/aft axis and very soft in the side-to-side axis.

The transmission lever is coupled to the transmission for shifting the gears and defines a transmission lever axis. The transmission plate is provided with a transmission lever receiver that is rigidly attached to the transmission lever by bolts. The transmission plate, like the shift plate, is triangular and provided with three transmission plate apertures that are located at the apexes of the triangular transmission plate. The transmission plate apertures are circumferentially spaced about the transmission lever axis and correspond to the shift plate apertures.

The control lever axis and the transmission lever axis are coaxial and the three shift plate apertures are lined up with the three transmission plate apertures. The three resilient bushings extend through the shift plate apertures and have a cap portion larger than the shift plate apertures that is positioned between the shift plate and the transmission plate. Three mounting bolts extend through central tunnels formed in the three resilient bushings and the transmission plate apertures.

The resilient bushings are rubber bushings having a cap portion with a radially extending lip and a sleeve portion. A rigid steel sleeve is located in the central tunnel of each resilient bushing. The rigid sleeve is shorter than the central tunnel. The mounting bolts are provided with a washer that engages the base of the sleeve portion of the resilient bushing. The mounting bolts pass through the rigid sleeve, the central tunnel and the transmission plate engaging lock nuts on the other side of the transmission plate. To mount the shift plate to the transmission plate, the resilient bushings are placed in the shift plate apertures so that the cap portion of the resilient bushing is between the shift plate and the transmission plate. The mounting bolts with washers are inserted through the central tunnel of each resilient bushing and engage lock nuts on the other side of the transmission plate. The shift plate is butted up against the cap portion of the resilient bushing which is sandwiched between the shift plate and the transmission plate. The sleeve portion of the resilient bushing passes through the shift plate aperture to the other side of the shift plate. As the lock nuts are screwed onto the mounting bolts the resilient bushing is compressed between the washer and the transmission plate. The sleeve portion deforms and expands radially in the space between the washer and the shift plate. The compression of the resilient bushing is limited by the rigid sleeve that limits the compression of the mounting bolt and lock nut.

The resilient bushings always maintain a layer of resilient material between the shift plate and the transmission plate. In this way there is no direct contact between the shift plate and the transmission plate and vibrations are dampened by the resilient material.

BRIEF DESCRIPTION OF THE DRAWINGS

FIG. 3 Is a partial cross sectional view of the one of the resilient bushings.

DETAILED DESCRIPTION

Figure 1:
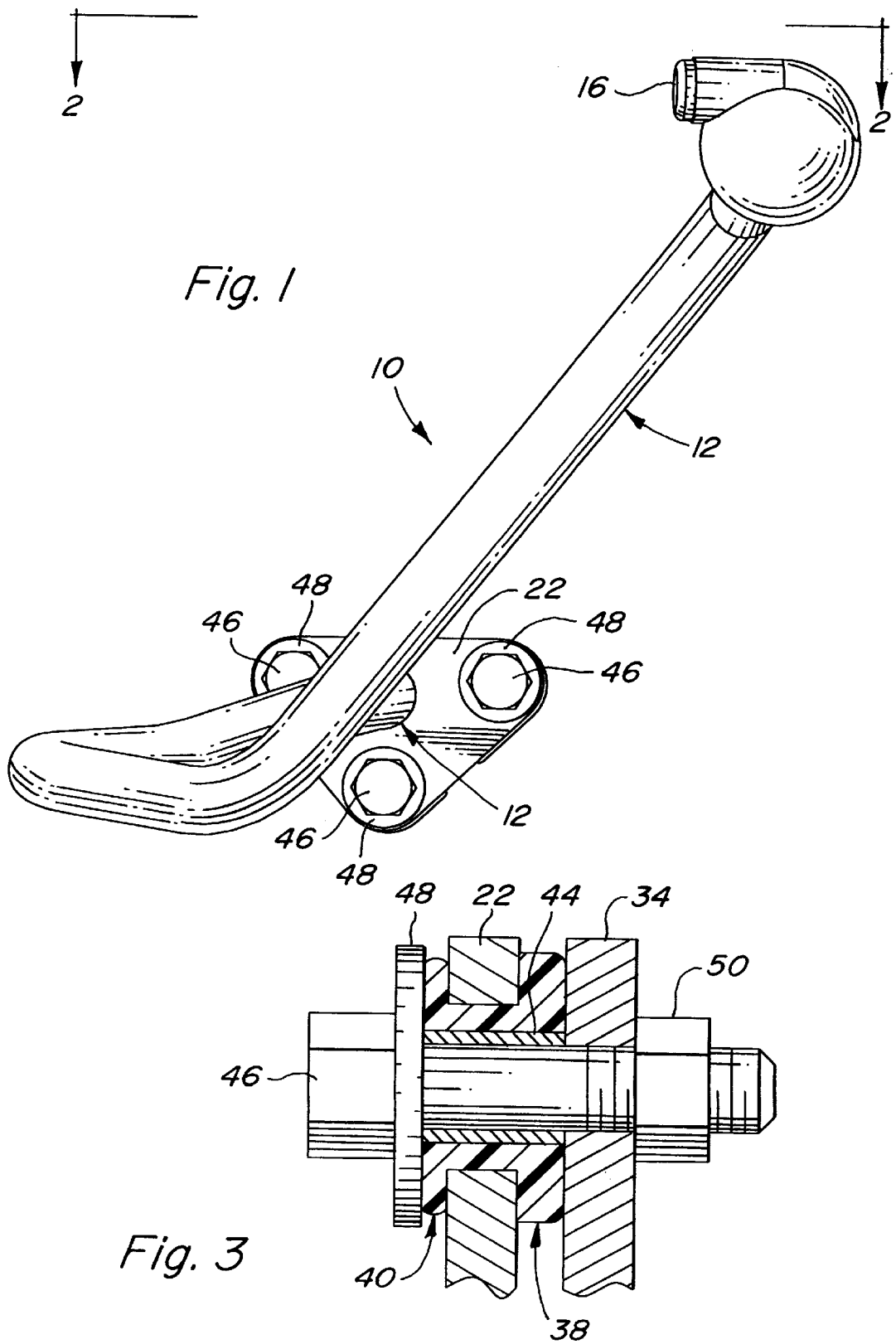
FIG. 1 is a top view of the shift lever of the present invention.
Figure 2:
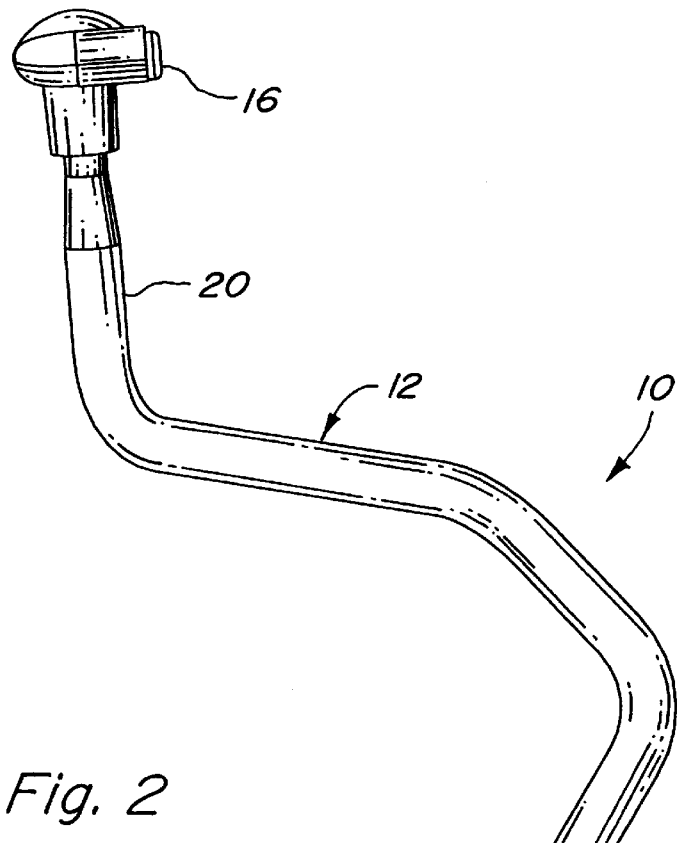
FIG. 2 is a side view of the shift lever of the present invention.
Figure 4:
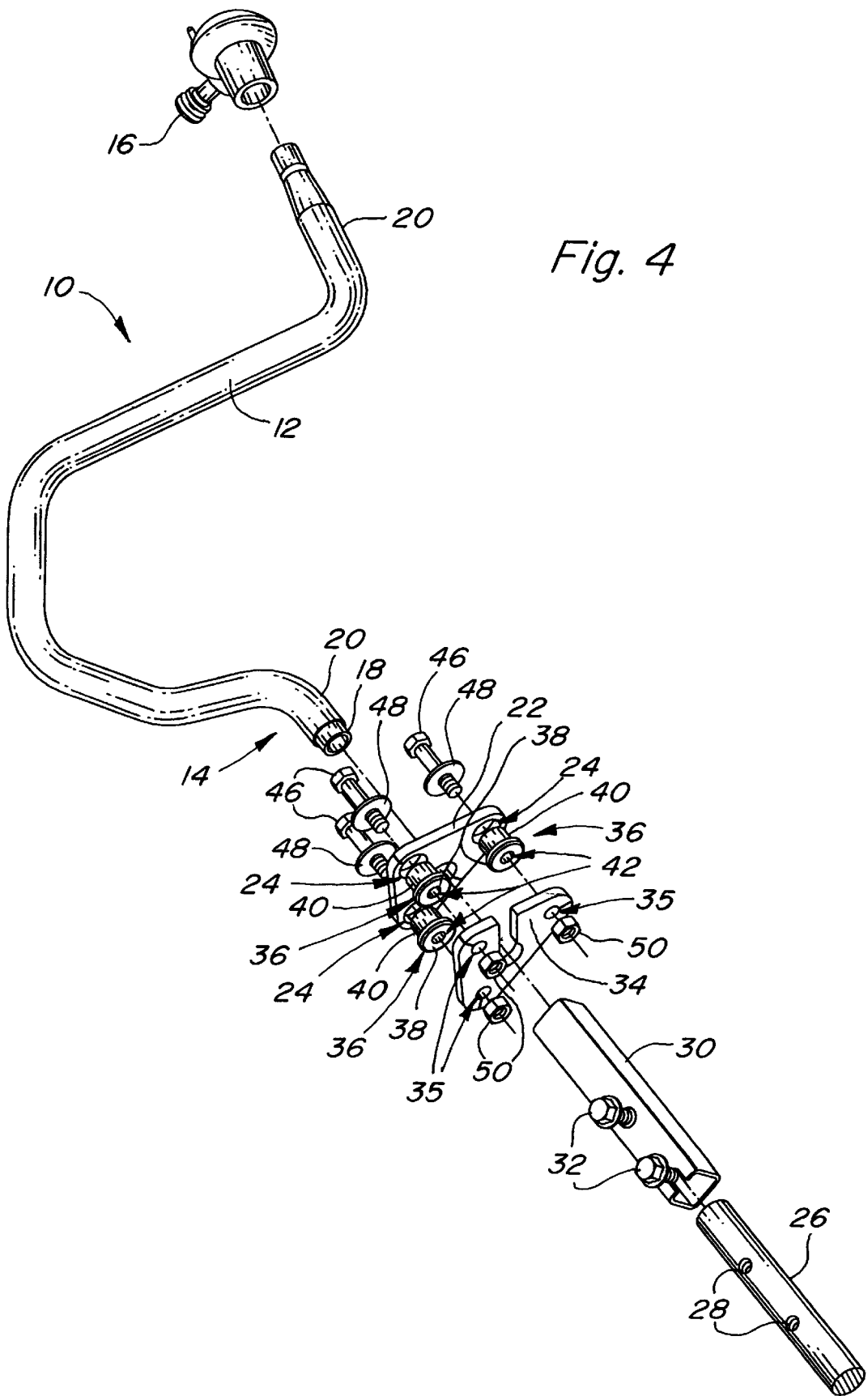
FIG. 4 is an exploded view of the shift lever of the present invention.

The shift lever of FIG. 1 is provided with a control lever 10 having a handle portion 12 and a base portion 14. The base portion 14 defines a control lever axis. The top of the handle portion 12 is provided with a push button 16 for a clutch disconnect switch. The control lever 10 comprises an inner thick wall tube 18 and an outer thin wall tube 20. As shown in FIG. 4, the inner thick wall tube 18 extends a small amount out of the base portion 14. It is rigidly mounted to triangular shift plate 22 by welding. Each of the apexes of the triangular shift plate 22 is provided with a shift plate aperture 24.

A transmission is provided with a transmission lever 26 having bolt holes 28. The transmission lever is detachably mounted to a square tube receiver 30 by bolts 32. The square tube receiver 30 is rigidly mounted to triangular transmission plate 34 by welding. The transmission lever 26 defines a transmission lever axis. The triangular transmission plate 34 is provided with three transmission plate apertures 35 that are arranged at the apexes of the plate 34. The control lever axis and the transmission lever axis are coaxial and the respective shift plate apertures 24 and transmission plate apertures 35 are lined up with one another.

The shift plate apertures 24 are larger than the transmission plate apertures 35. Three resilient rubber bushings 36 each having a cap portion 38 and a sleeve portion 40 are mounted in the larger shift plate apertures 24. The cap portion 38 has a radially extending lip that is larger than the shift plate apertures 24. The sleeve and cap portions 38 and 40 have a central tunnel 42 extending through each resilient bushing 36. The central tunnel 42 is provided with a rigid steel sleeve 44 that is shorter than the central tunnel 42. The rigid sleeve 44 limits the amount of compression that can be applied to the resilient bushing 36. In the illustrated embodiment, the rigid sleeve 44 extends for about half the distance of the central tunnel 42. Mounting bolts 46 having washers 48 extend through the central tunnel 42, the rigid sleeve 44 and transmission plate 34. A lock nut 50 is secured to each mounting bolt 46 on the other side of the transmission plate 34 for pulling the transmission plate 34 and shift plate 22 together until the rigid sleeve 44 contacts the washer 48 on one end and the transmission plate 34 on the other end. That portion of the sleeve portion 38 of the resilient bushing 36 located between the washer 48 and the shift plate 22 radially deforms outwardly to provide a layer of resilient material between the washers 48 and the shift plate 22.

In the illustrated embodiment the shift plate apertures 24 are larger than the transmission plate apertures 35. However this could be reversed with the transmission plate 34 having the larger of the apertures for receiving the resilient bushing 36. In this configuration the mounting bolt 46 and washer 48 extend from the other side of the transmission plate 34 and the lock nut engages the other side of the shift plate 22. In another configuration the larger apertures could be varied with two being on one plate and the third on the other plate. In addition, more than three apertures can be used. As such, the present invention should not be limited by the above described embodiment, but should be limited solely by the claims that follow.

We claim:

1. A vibration isolated shift lever for a mechanical transmission of a vehicle, the shift lever comprising:
    a control lever having a handle portion and a base portion, the base portion defining a control lever axis
    a shift plate is rigidly attached to the base portion of the shift lever, the shift plate having three shift plate apertures that are circumferentially spaced about the control lever axis;
    a transmission lever defining a transmission lever axis;
    a transmission plate is rigidly attached to the transmission lever and is provided with three transmission plate apertures that are circumferentially spaced about the transmission lever axis, the control lever axis and the transmission lever axis being coaxial and the three shift plate apertures being lined up with the three transmission plate apertures;
    three mounting bolts extending through the lined up shift plate apertures and transmission plate apertures, each of the bolts is provided with a resilient bushing formed of a resilient material, the resilient bushings are positioned between the shift plate and the transmission plate with the resilient bushings extending into the three shift plate apertures and the three transmission plate apertures so that resilient material is positioned between the shift plate and the transmission plate and there is no direct contact between the shift plate and the transmission plate.

2. A shift lever as defined by claim 1 wherein a rigid sleeve is inserted into each of the resilient bushings through which the respective mounting bolts are inserted, the resilient bushing being longer than the rigid sleeve.

3. A shift lever as defined by claim 2 wherein the resilient bushing is provided with a sleeve portion and a cap portion, the cap portion and the sleeve portion defining a central tunnel through which the mounting bolt passes and in which the rigid sleeve is located, the cap portion is positioned between the shift plate and the transmission plate.

4. A shift lever as defined by claim 3 wherein three of the three shift plate apertures and the three transmission plate apertures are larger and the sleeve portion of the resilient bushing and rigid sleeve extend through the larger apertures.

5. A shift lever as defined by claim 4 wherein each of the mounting bolts is provided with a washer which engages the sleeve portion of the resilient bushing and the rigid sleeve radially deforming the sleeve portion outwardly.

6. A shift lever as defined by claim 5 wherein the shift plate is shaped in the form of triangle having three apexes, the three shift plate apertures are located in the three apexes.

7. A shift lever as defined by claim 6 wherein the transmission plate is shaped in the form of triangle having three apexes, the three transmission plate apertures are located in the three apexes.

8. A shift lever as defined by claim 7 wherein the larger apertures are located in the shift plate.

9. A shift lever as defined by claim 8 wherein the transmission plate is provided with a receiver that is detachably mounted to the transmission lever.

10. A shift lever as defined by claim 9 wherein the base portion of the control lever is welded to the shift plate and the receiver is welded to the transmission plate.

11. A vibration isolated shift lever for a mechanical transmission of a vehicle, the shift lever comprising:
    a control lever having a handle portion and a base portion, the base portion defining a control lever axis
    a shift plate is rigidly attached to the base portion of the shift lever, the shift plate having three shift plate apertures that are circumferentially spaced about the control lever axis;
    a transmission lever defining a transmission lever axis;
    a transmission plate is rigidly attached to the transmission lever and is provided with three transmission plate apertures that are circumferentially spaced about the transmission lever axis, the control lever axis and the transmission lever axis being coaxial and the three shift plate apertures being lined up with the three transmission plate apertures;
    three mounting bolts having washers extend through the lined up shift plate apertures and transmission plate apertures, each of the bolts is provided with a resilient bushing formed of a resilient material, each of the resilient bushings having a cap portion and a sleeve portion, the cap portion is positioned between the shift plate and the transmission plate and the sleeve portion radially deforms into a space between the washer and one of the shift plate and the transmission plate.

12. A shift as defined by claim 11 wherein the cap portion and the sleeve portion of the resilient bushing define a central tunnel, a rigid sleeve is located in the central tunnel, the rigid sleeve being shorter than the central tunnel and controls how much the sleeve portion is radially deformed.

13. A shift lever as defined by claim 12 wherein the washer contacts the sleeve portion and the rigid sleeve, the rigid sleeve also contacting one of the shift plate and the transmission plate.

* * * * *